US008068430B2

(12) United States Patent  
Geva et al.

(10) Patent No.: US 8,068,430 B2  
(45) Date of Patent: Nov. 29, 2011

(54) HIGH QUALITY TIMING DISTRIBUTION OVER DSL WITHOUT NTR SUPPORT

(75) Inventors: Alon Geva, Hod Hasharon (IL); Ehud Malik, Shoham (IL); Yaakov Stein, Jerusalem (IL)

(73) Assignee: Rad Data Communications Ltd., Tel Aviv (IL)

( * ) Notice: Subject to any disclaimer, the term of this patent is extended or adjusted under 35 U.S.C. 154(b) by 191 days.

(21) Appl. No.: 12/263,893

(22) Filed: Nov. 3, 2008

(65) Prior Publication Data

US 2010/0111114 A1    May 6, 2010

(51) Int. Cl.  
*G01G 31/08* (2006.01)  
*H04J 3/16* (2006.01)

(52) U.S. Cl. ........................ 370/241; 370/350

(58) Field of Classification Search .................. 370/242, 370/243, 247, 314, 350, 395.21, 395.4, 503, 370/518, 352, 353, 356; 379/32.01, 84, 93.01, 379/93.04, 93.05, 333  
See application file for complete search history.

(56) References Cited

U.S. PATENT DOCUMENTS

| | | | |
|---|---|---|---|
| 5,440,313 | A | 8/1995 | Osterdock et al. |
| RE36,633 | E | 3/2000 | Fleischer et al. |
| 6,721,328 | B1 | 4/2004 | Nichols et al. |
| 6,937,613 | B1* | 8/2005 | Bedrosian .................... 370/465 |
| 2003/0093703 | A1* | 5/2003 | Oliver et al. .................. 713/400 |
| 2005/0058149 | A1 | 3/2005 | Howe |
| 2005/0265428 | A1 | 12/2005 | McCorkle |
| 2006/0227714 | A1* | 10/2006 | Griffin et al. ................. 370/241 |
| 2008/0052394 | A1 | 2/2008 | Bugenhagen et al. |
| 2008/0075061 | A1 | 3/2008 | Hatala et al. |

OTHER PUBLICATIONS

ITU-T Recommendation G.991.2. This publication can be found at http://www.itu.int/ITU-T/publications/recs.html.  
ITU-T Recommendation G.992.1. This publication can be found at http://wvvvv.itu.int/ITU-T/publications/recs.html.  
ITU-T Recommendation G.992.3. This publication can be found at http://www.itu.int/ITU-T/publications/recs.html.  
ITU-T Recommendation G.992.5. This publication can be found at http://www.itu.int/ITU-T/publications/recs.html.  
ITU-T Recommendation G.8261. This publication can be found at http://www.itu.int/ITU-T/publications/recs.html.  
ITU-T Recommendation I.363 (ATM AAL1). This publication can be found at http://www.itu.int/ITU-T/publications/recs.html.  
ITU-T Recommendation Y.1413. This publication can be found at http://www.itu.int/ITU-T/publications/recs.html.  
International Search Report for International Application No. PCT/IL09/01021 mailed Mar. 22, 2010.

* cited by examiner

*Primary Examiner* — Hanh Nguyen  
(74) *Attorney, Agent, or Firm* — Pearl Cohen Zedek Latzer, LLP

(57) ABSTRACT

A method and system in which a Digital Subscriber Line Access Multiplexer (DSLAM) that is part of a DSL (Digital Subscriber Line) system is able to provide synchronous services to end user equipment connected to the DSLAM via a DSL link and Customer Premises Equipment (CPE). A sniffer device having direct or indirect access to a Primary Reference Clock (PRC) of the DSL system calculates the phase difference between the PRC and the DSLAM's Local Timing Reference (LTR). The phase difference is sent to the CPEs requiring accurate reference clock frequency. The CPEs are able to derive the PRC from the phase difference information transmitted by the sniffer device thus enabling synchronous end user equipment operation.

20 Claims, 11 Drawing Sheets

HIGH QUALITY TIMING DISTRIBUTION OVER DSL WITHOUT NTR SUPPORT

FIELD OF THE INVENTION

The present invention relates generally to the field of digital communications and in particular to Digital Subscriber Line (DSL) technology. More specifically, the invention relates to providing a timing reference over a DSL link that does not support Network Timing Reference (NTR).

BACKGROUND OF THE INVENTION

DSL has become the technology of choice for delivery of high bandwidth data over copper access links, replacing legacy TDM (Time Division Multiplexing) services. This is due to the required telephony access infrastructure being almost universally present, and to the continuous increase in DSL bit-rates.

We can distinguish two types of services delivered by DSL:
1. Synchronous services, such as legacy TDM (E1s or T1s), which require distribution of the associated service clock.
2. Asynchronous data services, such as Internet or asynchronous voice applications (e.g., cellular compressed voice calls).

Synchronous services were the first deployed, with DSL lines replacing TDM links. For example, HDSL (ITU-T Recommendation G.991.1) and later SHDSL (ITU-T Recommendation G.991.2) were designed to replace standard T1 (1.544 Mbit/s) or E1 (2.048 Mbit/s) services, and extended the applicability and range of these services. However, the focus rapidly shifted to asynchronous broadband data services. For example, ADSL (Asymmetric DSL) (and all its derivatives) and VDSL (Very High Speed DSL) are commonly used to extend an asynchronous packet network (e.g., Ethernet, IP, or MPLS) to customer sites.

Due to the initial focus on synchronous services, DSL standards include built-in mechanisms to distribute the service clock, referred to as Network Timing Reference or NTR. However, current Digital Subscriber Line Access Multiplexers (DSLAMs) are optimized for asynchronous data services, and are thus often not equipped with NTR functionality. This does not impact their main aim of providing asynchronous services to residential customers, but hinders the provision of synchronous services, such as TDM pseudowires.

For synchronous services the service clock needs to be accurately delivered to the end-application in order to prevent buffer overflow and bit errors. Moreover, even if the service itself is fully asynchronous, the end equipment might still need a good reference clock for its operation. For example, cellular base-stations require a very accurate and stable clock to derive their RF transmission frequency. In the past, such base-stations derived their clock from the incoming TDM link, but with the replacement of TDM links by DSL lines optimized for asynchronous services, this inherent frequency distribution is lost.

FIGS. 1, 2 and 3 depict various prior art clock distribution schemes for DSL technologies. FIG. 1 shows a Network Timing Reference (NTR) clock distribution scheme, such as described in U.S. Pat. No. 6,937,613 to Bedrosian. As can be seen in FIG. 1, at the Central Office (CO) side, the Local Timing Reference (LTR) 30 within the central office DSL Access Multiplexer (DSLAM) 17, is locked to an external timing source 1. Such a timing source is typically a Primary Reference Clock (PRC) with long-term frequency accuracy within $\pm 10^{-11}$ of Coordinated Universal Time (UTC). Since the DSL mapper 18, which maps the incoming payload 31 into the transmitted sequence of symbols 19, is fed with the local timing reference, the physical-layer of the transmission is locked to the external timing source. At the remote side, the DSL de-mapper 20 within the Customer Premises Equipment (CPE) 13 recovers the external timing source information from the incoming symbols rate and uses this recovered clock information 15 to transmit the recovered payload 14 to the end-user equipment 16.

A similar approach is used in ITU-T Recommendation G991.2 (SHDSL) where the DSLAM's clock may be locked to a Network Timing Reference (NTR), which is an 8 KHz clock typically traceable to a PRC. The remote modem may then extract NTR timing information from the physical layer. While ITU Recommendation G991.2 does not mandate this NTR functionality, most SHDSL DSLAMs do support it.

FIG. 2 depicts a clock distribution scheme that uses the SRTS (Synchronous Residual Time Stamp) method, as described in Reissued Pat. No. 36,633 to Fleischer et al. This scheme enables remote recovery of a reference clock without locking the physical-layer clock. Instead, the difference between the reference clock and the physical-layer clock is encoded and transmitted, enabling the remote terminal to mathematically reconstruct the desired reference clock frequency. This principle has been extended to general networks, and is now called 'common clock frequency recovery' (see ITU-T Recommendation Y.1413 subclause 10.1.3) or 'differential clock recovery' (see ITU-T Recommendation G.8261 subclause 8.2).

As illustrated in FIG. 2, SRTS encoder 21 within clock distribution 3 has access to both the reference clock that needs to be distributed and network clock 39 (i.e., the common clock). The momentary phase difference between these two clocks is encoded into four bit SRTS words that are periodically delivered to packet assembly 23 (via interface 22) where they are assembled into packets and sent across packet network 4. At the other end of the network in clock recovery 37, the four bit SRTS words are extracted in packet disassembly 38 and periodically delivered to the differential clock recovery 27 (via interface 15) that also has access to the same network clock 39. Using this network clock and the four bit SRTS words, the original service clock can be recovered on output line 29.

The SRTS method generally provides a very accurate recovered clock as it is not affected by impairments introduced by higher network layers such as Packet Delay Variation (PDV). Nevertheless, a basic requirement for its use is CO and customer premises access to a common clock. Having such a common clock is, in many networks and applications, not possible for various reasons; hence, for such cases other clock recovery techniques must be used. ITU-T Recommendation G.992.1 (ADSL), and its later variants ITU-T Recommendations G.992.3, G.992.4, and G.992.5, support an indirect NTR mechanism, based on similar principles. Rather than directly locking the physical-layer symbol clock to the external frequency reference, the physical-layer clock of ADSL and its derivatives is locked to a Local Timing Reference (LTR), and the phase difference between the external reference and LTR is periodically transmitted. The DSLAM encodes this phase difference in four bits, and places these in a fixed location within the ADSL frame. At the CPE these four bits are extracted from the ADSL frame and are used in combination with the recovered physical-layer clock (LTR) to re-generate the original NTR clock. VDSL (ITU-T Recommendation G.993.1) uses the same method of NTR distribution, however it encodes the phase difference between NTR and LTR in eight bytes.

Similar to the situation for SHDSL, the ADSL and VDSL standards do not mandate NTR support. However, unlike the situation described above, where the majority of SHDSL DSLAMs support NTR in practice, ADSL and VDSL DSLAMs most often do not support it. As aforementioned, this is due to ADSL and VDSL being primarily used to provide asynchronous services to end users, where NTR transport functionality is not required.

The lack of NTR transport support within the DSLAM necessitates the deployment of other frequency distribution means for those end applications that require an accurate frequency reference. U.S. Pat. No. 5,440,313 to Osterdock et al. describes the use of a GPS receiver as a frequency reference. GPS receivers can indeed provide a stable and accurate frequency reference to end applications, however they suffer the drawbacks of being relatively expensive, involving costly and complicated installation procedures, and are only applicable where GPS can be reliably received (e.g., where rooftop access is possible). In similar fashion, a dedicated TDM link can sometimes be provided purely for frequency distribution.

FIG. 3 presents the general concept of Adaptive Clock Recovery (ACR) as applied to DSL systems without NTR support. This concept is based on the more general principle of adaptive clock recovery based solely on the arriving data packet flow, such as taught by U.S. Pat. No. 5,396,492 to Lien. That invention includes a destination node that receives data packets from a network and stores them in a buffer. The data packets are read out of the buffer using a locally generated clock. The fill level of the buffer is monitored and used to control the frequency of the locally generated clock, thus adapting the locally generated clock to the reference clock at the source of the packet flow.

Dedicated timing packets are sent from a master clock distribution 3 located somewhere within the core network. This clock distribution unit receives a clock reference traceable to a Primary Reference Clock (PRC) and periodically transmits dedicated timing packets conveying frequency information, to all CPEs 13. Such dedicated timing packets could belong to a constant rate TDM pseudowire flow or could be time distribution protocol packets, e.g., according to IEEE (Institute of Electrical and Electronic Engineers) standard 1588-2008 or to the IETF (Internet Engineering Task Force) Network Time Protocol (NTP) described in RFC (Request For Comments) 1305. These timing packets traverse the packet network 4 and are directed by DSLAM 10 to the relevant CPE 13. Arriving at CPE 13 these packets are used by the ACR function 33 to regenerate a frequency reference locked to the source PRC, resulting in the End User Equipment (EUE) 16 receiving frequency traceable to a PRC via clock interface 29.

The scheme of FIG. 3 suffers from a substantial drawback. All ACR methods rely directly or indirectly on the arrival times of timing packets. Packet arrival times are distorted by Packet Delay Variation (PDV) introduced by the end-to-end path. DSL links in particular tend to introduce considerable PDV, precluding ACR-based schemes from conformance to the stringent frequency distribution standards required by some applications.

There is therefore a need for inexpensively providing an accurate and reliable substitute for NTR for DSLAMs that do not support standard NTR.

SUMMARY OF THE INVENTION

The present invention enables adding Network Timing Reference (NTR) functionality to a DSLAM that does not support standardized NTR frequency distribution, without the need to upgrade the DSLAM's hardware or software.

The present invention is embodied as a DSL-capable device, hereinafter referred to as a sniffer. The sniffer is external to the DSLAM and may be located anywhere in the area served by the DSLAM. The sniffer may be fed by a DSL connection to a single port on the DSLAM. The sniffer may additionally have (direct or indirect) access to the PRC source whose frequency needs to be distributed. The sniffer passively observes the two clock signals, viz., the physical-layer clock locked to the DSLAM's LTR and the PRC source clock and computes the phase difference between these two clock signals. The sniffer then sends, to those CPEs requiring accurate reference clock frequency, timing packets containing the phase difference between the PRC source clock signal and the DSL LTR clock. These timing packets, which can be formatted as ToP (Timing over Packet) flows, can now be easily used by the remote CPEs to recover the original PRC source frequency for their corresponding end user equipment applications.

DETAILED DESCRIPTION

Figure 1:
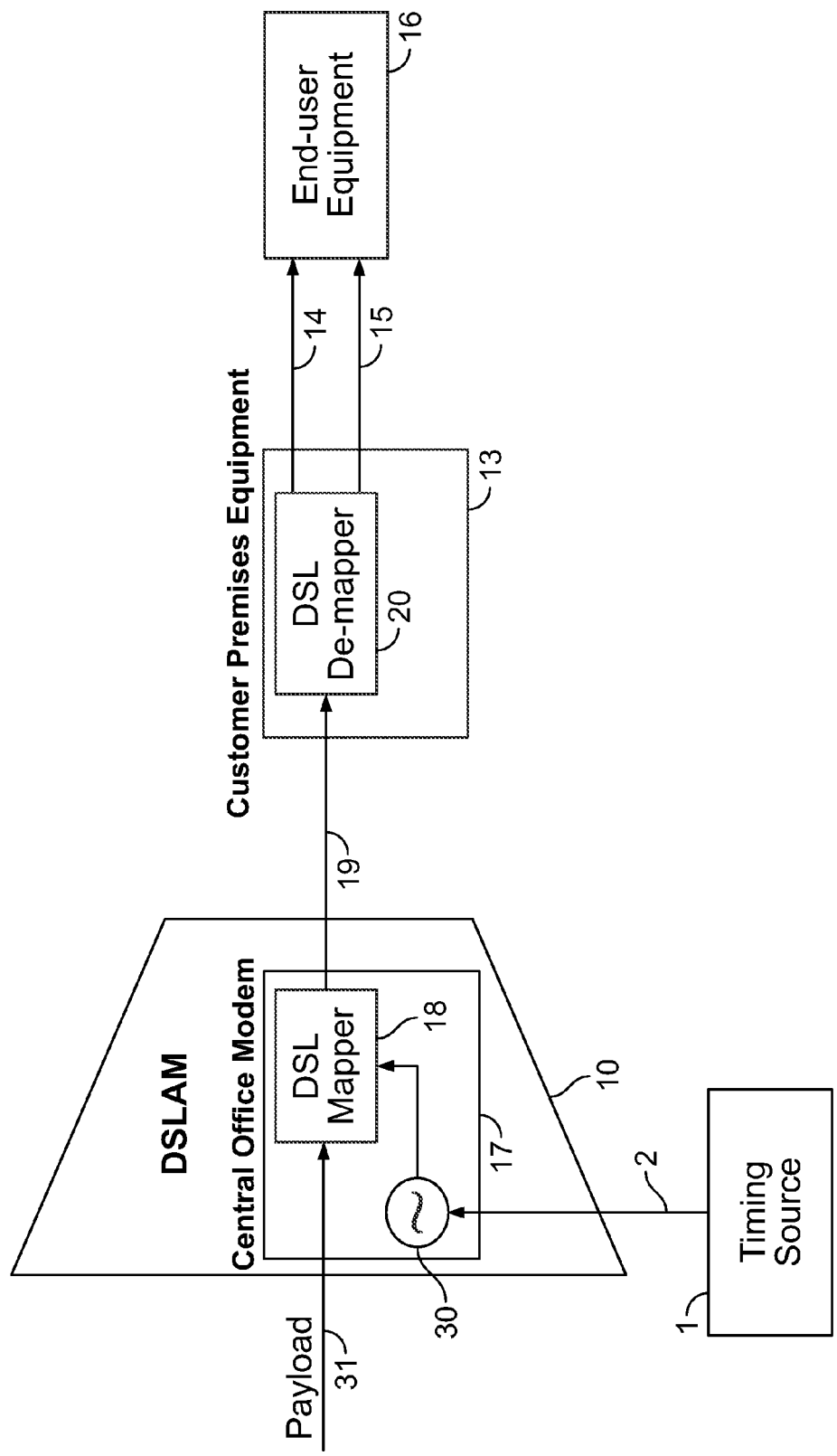
FIG. 1 illustrates the basic NTR clock distribution scheme common to all popular DSL technologies.
Figure 2:
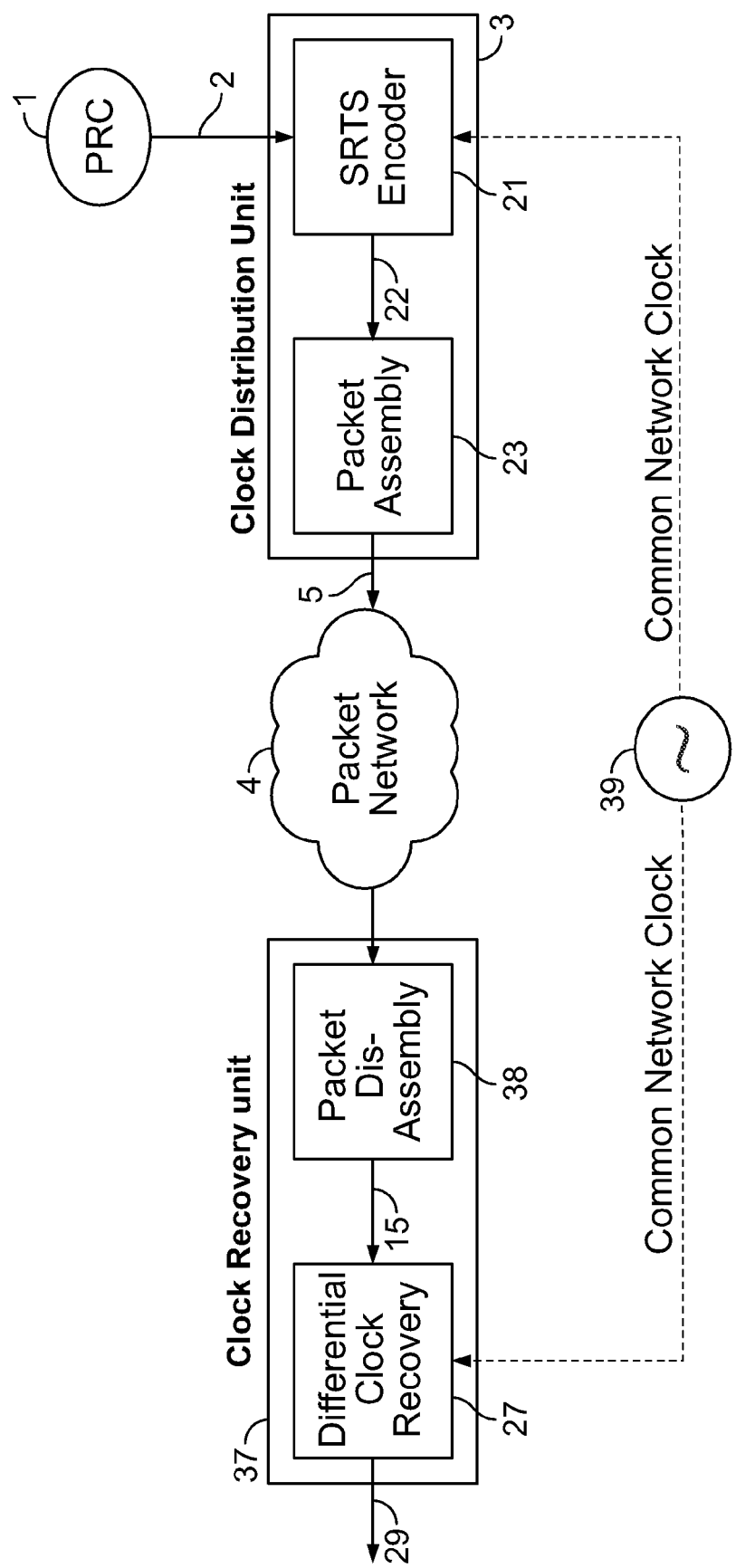
FIG. 2 illustrates a prior art clock distribution scheme based on Synchronous Residual Time Stamps (SRTS)

In the below description, the sniffer is a device that compares two different clock signals. One of these clock signals is indirectly derived from a DSL link, and represents the Local Timing Reference (LTR) signal used by the DSLAM to dictate physical-layer timing all of its DSL lines. We assume here that the physical-layer clock of all the DSL ports of a DSLAM, even a DSLAM with no NTR support, share a common Local Time Reference (LTR), usually an internal free-running oscillator. Thus, all CPEs fed by a single DSLAM likewise share a common physical layer clock. The second clock signal can be traced to a Primary Reference Clock (PRC). It is to be understood that by PRC we intend any high quality frequency source, which may typically be a PRC according to international standards, or a unit that derives a frequency reference traceable to a PRC. This second clock signal may be derived directly (when the sniffer is collocated with the PRC) or indirectly (when the PRC clock signal is disseminated over a packet switched network) from the PRC source. The sniffer determines the phase difference between these two clock signals, encodes this phase difference into Encoded Phase Difference Information (EPDI), packetizes this EPDI into timing packets according to some protocol, and forwards the timing packets to CPEs connected to the same DSLAM. The timing packets may be forwarded by inserting them directly to the DSLAM's switch (when the sniffer is collocated with the DSLAM), or by sending them over the DSL link connecting the DSLAM to the sniffer.

The sniffer has three logical connections to other devices, namely a) a first input connection, which is typically a DSL port, from which it observes the DSLAM's LTR clock, b) a second input connection, from which it observes the PRC clock either directly or over a network, and c) an output connection, typically a network connection, to which it forwards timing packets containing encoded phase difference information. In specific embodiments the sniffer may have two or three physical ports connecting it to other devices. In one embodiment, two physical ports are sufficient since the logical output connection may share a physical port with one or the other of the logical input connections. It is not possible to collapse all three logical connections into a single (DSL) port, due to the significant PDV of the DSL line, as previously discussed.

In addition to its physical ports, the sniffer comprises a phase difference encoder (PDE) and a packetizer. The PDE performs two functions. First it calculates the phase difference between the DSL timing information (i.e., the DSLAM's LTR signal) and the PRC clock. It then encodes said calculated phase difference, generating the EPDI. The packetizer then encapsulates said EPDI into timing packets suitable for forwarding over the communications network as a timing-over-packet (ToP) flow. The encapsulation performed by the packetizer refers to the placing of the EPDI into packets in a format acceptable to the network over which the EPDI is to be sent.

In the following specific embodiments of the sniffer the first logical connection is referred to as a DSL line input port, the second logical connection is referred to as a (direct or indirect) timing input port and the third logical connection is referred to as a ToP output port. Network elements (e.g. DSL modems) connected to DSL links that need to recover the PRC clock will be referred to as Customer Premises Equipment (CPE). Devices implementing applications that use said recovered timing (e.g., cellular base-stations) will be called End User Equipment (EUE).

Customer Premises Equipment (CPE) devices connected to DSL links emanating from the same DSLAM and receiving said ToP packets (over the DSL links) are able to decode the EPDI, add the phase difference to the physical-layer DSL clock (or timing information, contained in the DSL links) that they observe, and thus recover the PRC clock. This recovery of the PRC clock by such devices is thus enabled by the sniffer device of the present invention.

It will be obvious to one skilled in the art that the differential clock recovery functionality maybe located in the EUE rather than the CPE. In such cases, the ToP packets are transferred by the CPE to the EUE. The physical layer DSL clock (or timing information) is transferred by the CPE to the EUE in any appropriate format.

Figure 4A:
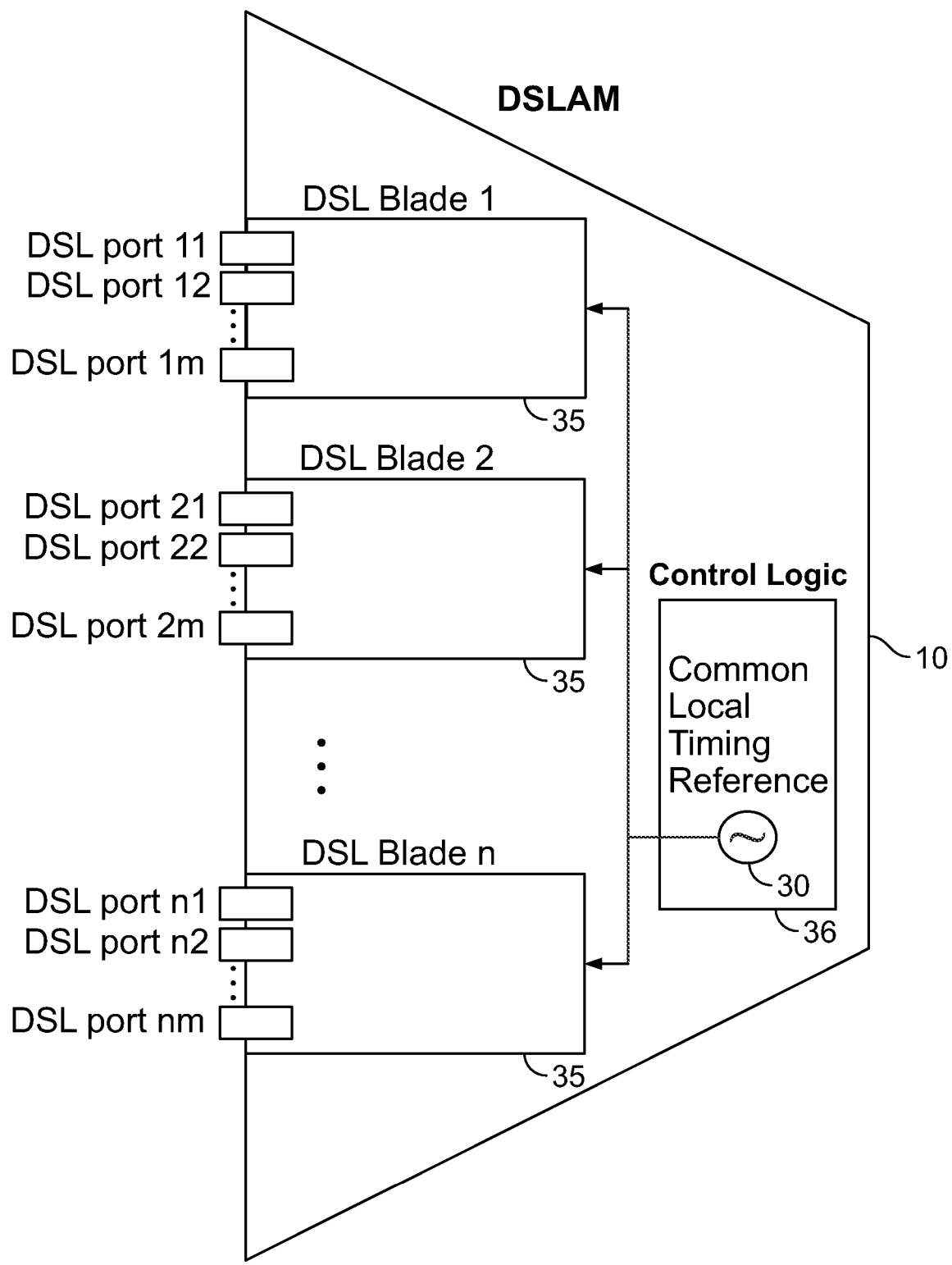
FIG. 4*a* depicts a typical DSLAM wherein the physical-layer timing of all DSL ports is derived from a single internal oscillator.
Figure 4B:
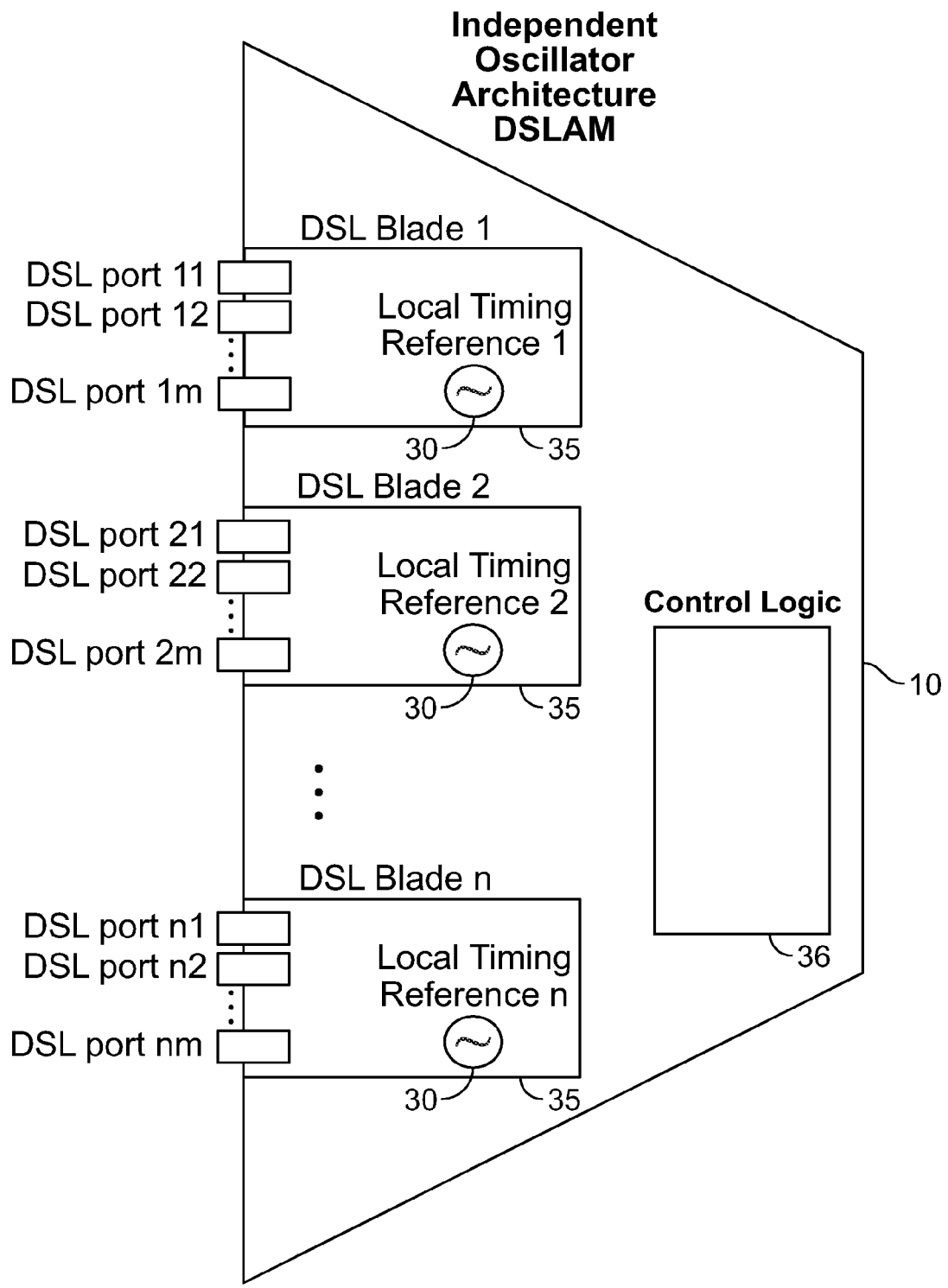
FIG. 4*b* depicts an "independent oscillator architecture" DSLAM where each blade has its own independent oscillator.

FIGS. 4a, 4b illustrate architectures of DSLAMs 10 that do not support standard NTR clock distribution. In a commonly encountered DSLAM architecture, presented in FIG. 4a, all DSL blades 35 (and hence all the DSL ports) of the DSLAM 10 are timed from a single LTR 30 within the DSLAM control logic 36. For such a case, one of the DSL ports within the DSLAM must be dedicated for connection to the sniffer, and is therefore not available for customer service.

A DSLAM conforming to the independent oscillator architecture is shown in FIG. 4b. For the independent oscillator architecture, each of DSL blades 35 is timed from an independent LTR 30. In this case the physical-layer clock of each DSL blade is different and it is therefore required to connect a separate sniffer to each blade to which CPEs requiring timing information are connected. This results in the loss of one DSL port per DSLAM blade to which a sniffer is connected. From here on we shall use wording suited to the first architecture, but one well versed in the art will readily understand the changes required to adapt our discussion to the independent oscillator case.

Figure 5A:
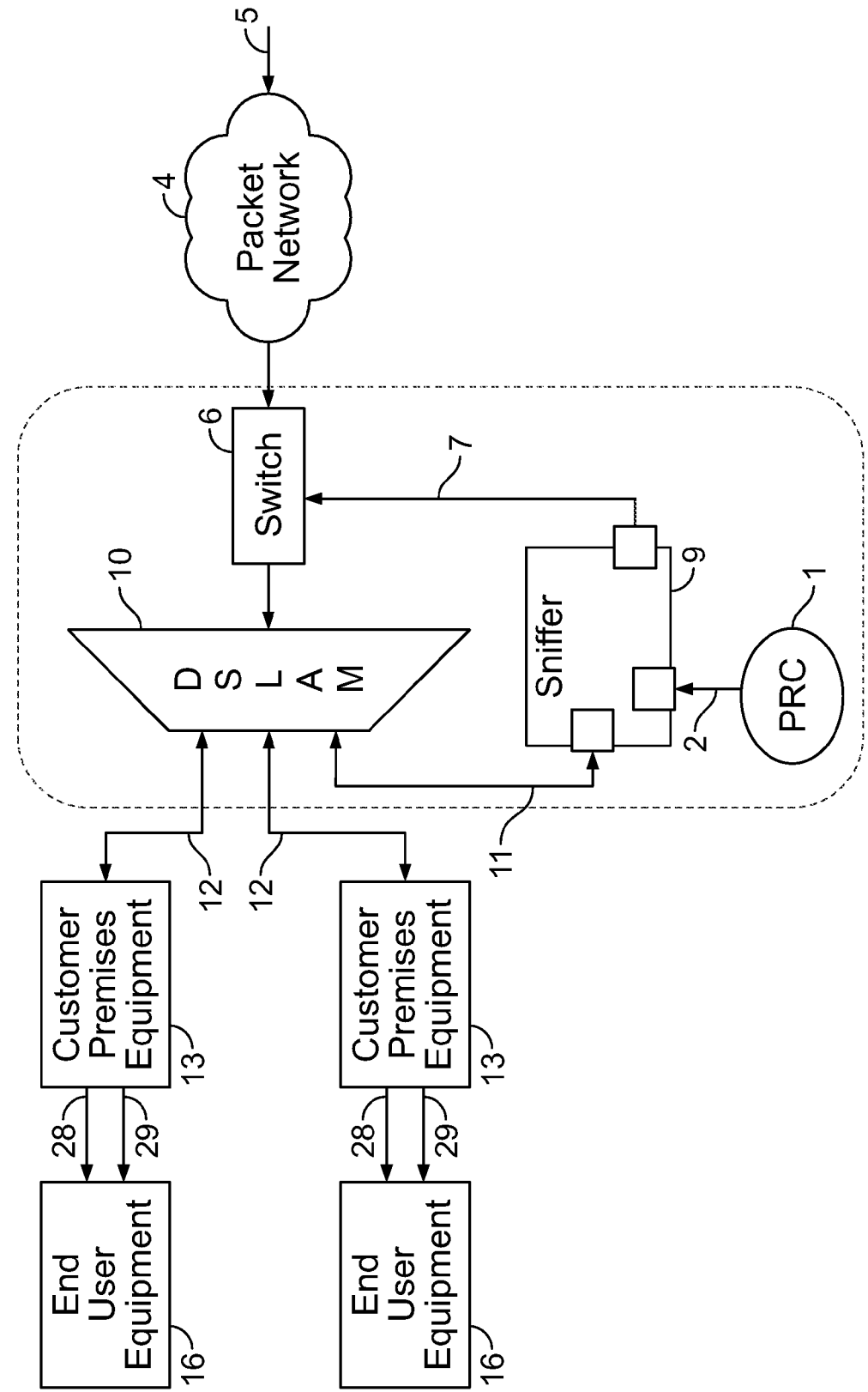
FIG. 5*a* depicts a first embodiment of the present invention where both the sniffer and the PRC source are co-located with the DSLAM.

In a first embodiment of the invention, presented in FIG. 5a, DSLAM 10 is connected to CPE DSL modems 13 via DSL copper line connections 12. The CPEs 13 are, in turn, connected to End User Equipment (EUE) 16 using two interfaces: a data interface 28 and a clock interface 29. These logically distinct interfaces may be merged into a single physical interface carrying both data and timing to the end user equipment.

Another DSL port of DSLAM 10 is connected via DSL line 11 to the sniffer 9, which is also connected to an external PRC source 1 via a standard timing interface 2. Such a standard timing interface could be a 2.048 MHz clock interface or a 2.048 Mbit/s data interface. In this embodiment of the invention sniffer 9 and PRC source 1 are co-located with the DSLAM (as indicated by dashed lines) while in a second embodiment (later discussed) the sniffer may be located at some remote location.

From the viewpoint of DSLAM 10, the sniffer 9 is an ordinary CPE device. Moreover, the DSL physical-layer clocks of all the DSL links emerging from DSLAM 10 are locked to the DSLAM's LTR, and hence the sniffer and all CPE modems observe the same physical-layer clock. Once DSL link 11 is set up, the sniffer 9, locking onto the received physical-layer clock, has full information on the DSLAM's LTR.

Sniffer 9 has access to both the DSL physical-layer clock (and hence access to DSLAM's 10 LTR clock) as well as to the PRC source 1. The sniffer may thus calculate the instantaneous phase difference between these two clocks, encode and forward this information as a ToP flow via link 7 and switch 6 to DSLAM 10 and ultimately to CPE 13. The CPE 13 may then recover the EPDI from the received ToP packets, decode this information to form an instantaneous phase difference signal, and finally add this signal back to the common clock (LTR) phase to recover the desired PRC information.

In order to facilitate its transmission, the phase difference is first encoded by the sniffer to form EPDI. It is this EPDI that is periodically transmitted from the sniffer to those CPEs needing this information. One method of concisely encoding this phase difference is to form a four bit Synchronous Residual Time Stamp (SRTS) as described in U.S. Pat. No. RE 36,633 to Fleischer et al. Another method is to use a full timestamp, as described in subclause 8.4 of ITU-T Recommendation Y.1413. Alternatively, any other form of EPDI may be used, as long as the original phase difference may be unambiguously inferred at the CPE.

As already discussed, in this embodiment the sniffer and PRC source are collocated with the DSLAM. Timing packets containing the EPDI are transmitted via network link 7 to network switch 6, which forwards them to DSLAM 10 that sends them over DSL link 12 to remote CPEs 13. Note that switch 6 is connected to a packet network 4 that receives information from at least one communication link 5.

Figure 5B:
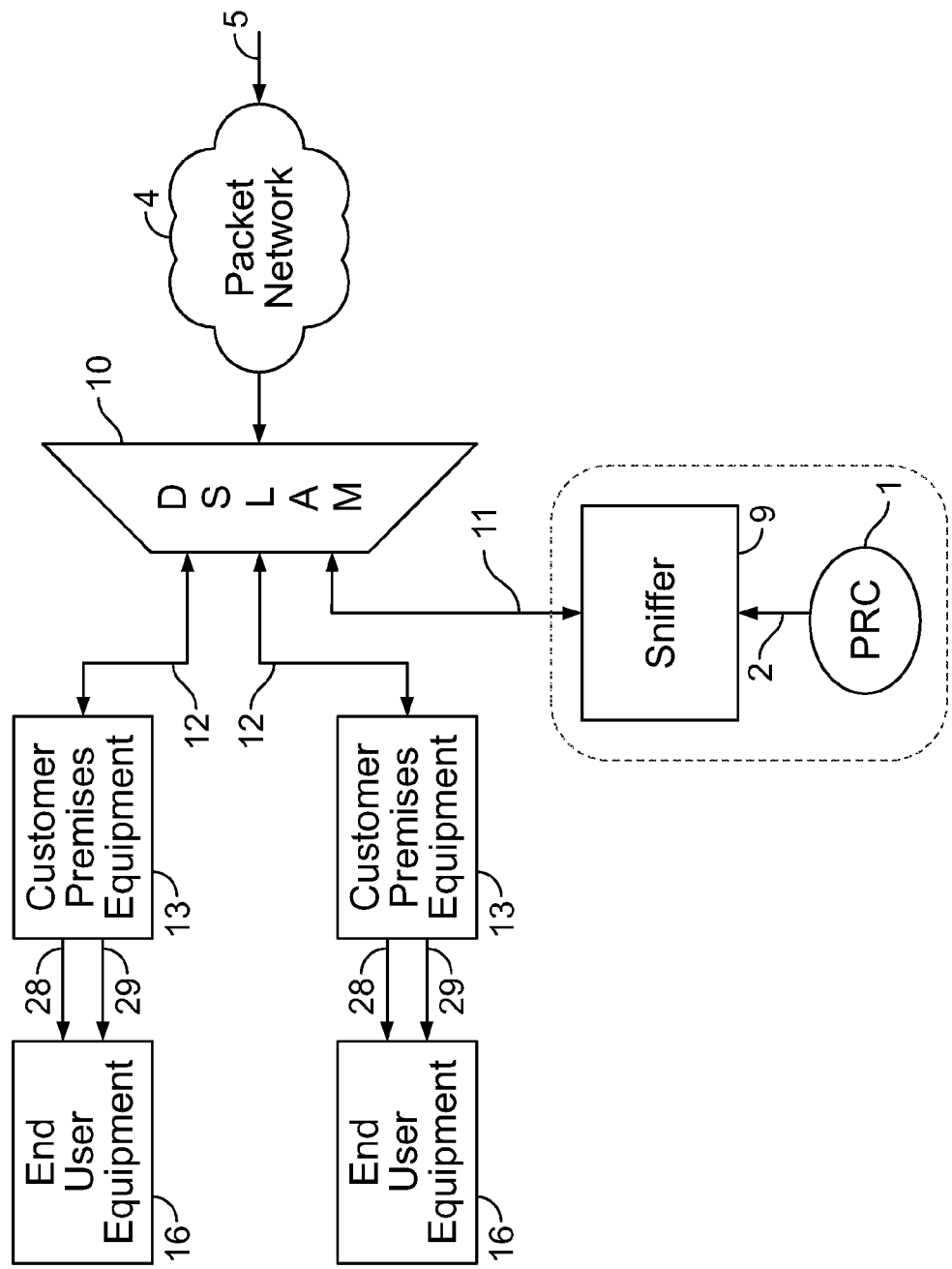
FIG. 5*b* depicts a second embodiment of the present invention where the sniffer and the PRC source are remotely located.

In a second embodiment of the invention, presented in FIG. 5b, the sniffer has direct access to the PRC source, but is not collocated with the DSLAM. Hence, DSL link 11 can be used to send the dedicated timing packets containing the EPDI, directly to DSLAM 10 and from there, via the DSLAM's internal switching mechanism (not shown), to remote CPEs 13. Note that when using this approach, there is no need for direct connection 7, and no need to reserve a port on switch 6 for the sniffer. Packet network 4, which receives information from at least communication link 5, is connected directly to DSLAM 10.

Once the CPE modem recovers the PRC information, this regenerated clock can be distributed to EUE 16 via interface 29 together with the data payload on interface 28. EUE 16 may furthermore send data back to the CPE over interface 28 using the timing information it received over interface 29. In a variation of this embodiment (not shown in the figure) DSL link 11 is used to carry data traffic towards a collocated EUE via sniffer 9 (in which case the sniffer will also be endowed with standard CPE features).

Figure 3:
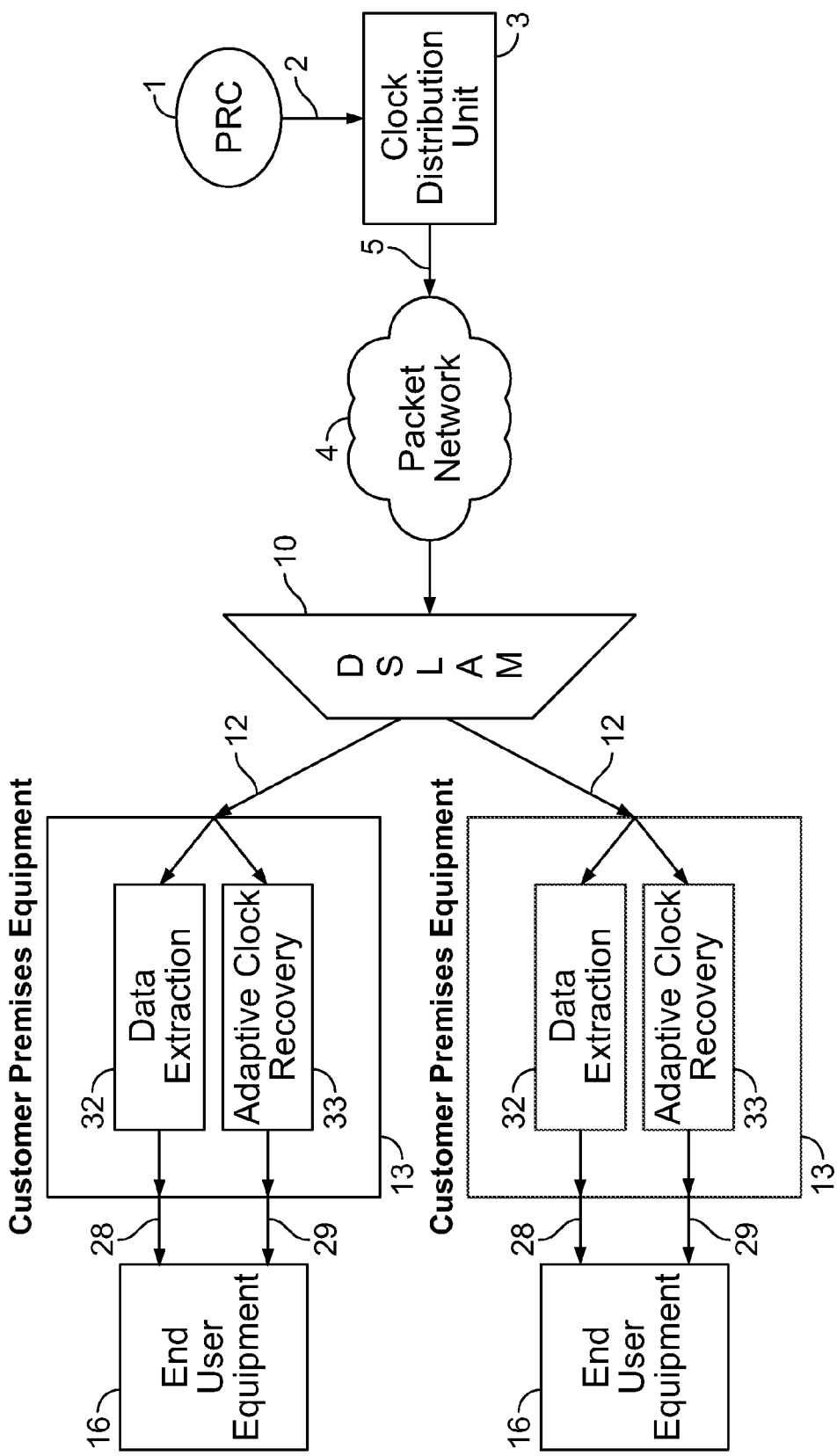
FIG. 3 illustrates a prior art clock distribution scheme based on Adaptive Clock Recovery (ACR)
Figure 5C:
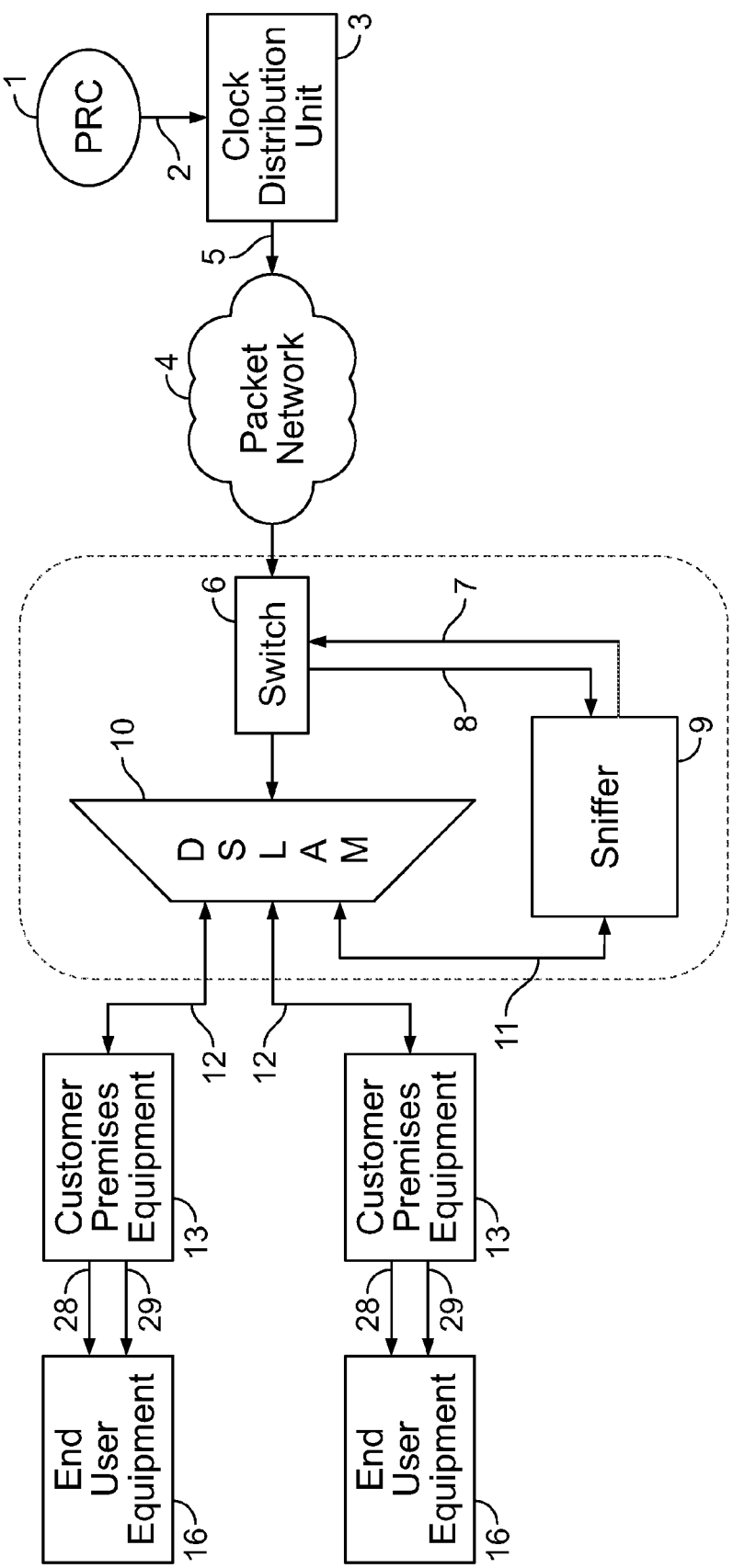
FIG. 5*c* illustrates a third embodiment of the present invention where the remote PRC source is recovered by the sniffer from a timing-over-packet (ToP) flow.

In a third embodiment of the invention, presented in FIG. 5c, PRC source 1 is not directly connected to sniffer 9. Instead, it is remotely located somewhere in network 4. In this embodiment, a master clock distribution 3, usually collocated with the PRC, periodically transmits dedicated timing packets, conveying PRC source 1 timing information, to sniffer 9 via network interface 5, packet network 4, network switch 6 and network interface 8. Such timing packets can take the form of a TDM pseudowire flow or may conform to a ToP distribution scheme such as IEEE 1588-2008 or NTP. Sniffer 9 can now use these received timing packets to recover the original frequency of PRC source 1 using, as previously described with respect to FIG. 3 and accompanying text, ACR methods known to those well versed in the art.

In a variation of this third embodiment, when a 'common clock' of any sort exists at both the location of master clock distribution unit 3 and the DSLAM/sniffer location, it can be used to distribute PRC source 1 to sniffer 9 using differential clock recovery methods.

As in the first and second embodiments, once the sniffer has recovered the PRC information it may calculate the instantaneous phase difference between the common clock and PRC. It then encodes this phase difference to form the EPDI, and forwards it in dedicated ToP packet format to the appropriate CPEs. The CPE may then decode the EPDI and add this difference back to the common clock (LTR) phase to recover the desired PRC information.

In this embodiment the sniffer 9 is collocated with DSLAM 10. The sniffer 9, having recovered the PRC information via ACR methods, generates ToP packets, and sends them via network link 7, network switch 6, DSLAM 10 and DSL link 12 to remote CPEs 13.

Figure 6A:
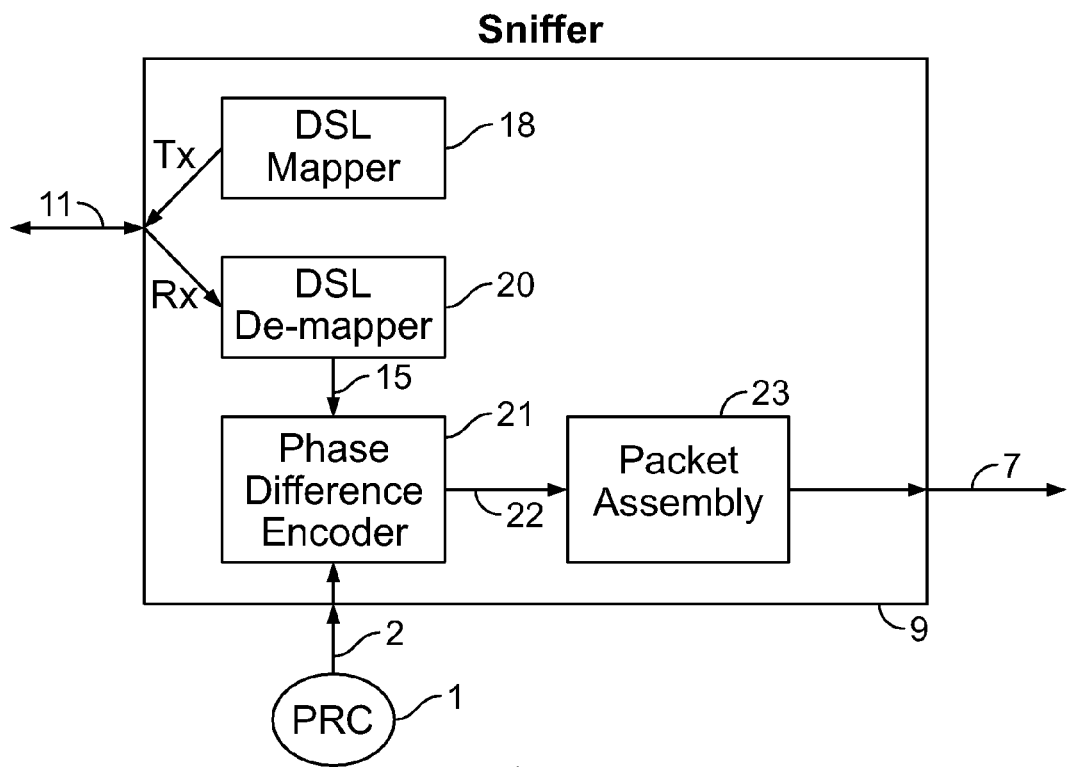
FIG. 6*a* depicts the internals of a sniffer suitable for the first embodiment of the present invention where furthermore the timing packets are forwarded to the DSLAM network-side port.

In another variation of this third embodiment a number of independent clock sources (e.g., PRC sources of different carriers) need to be distributed to the EUEs (each PRC source to a designated group of EUEs). This may be accomplished by having a number of ACR units within sniffer 9, each recovering its associated PRC source. The instantaneous phase difference between each of the ACR clocks and the LTR clock can now be encoded into separate EPDI, which is encapsulated into multiple timing packet flows each representing one PRC source FIG. 6a illustrates the generic structure of a sniffer 9 for the first embodiment presented in FIG. 5a, where PRC source 1 is co-located with DSLAM 10. In this case, DSLAM's LTR clock is received over link 11 and extracted by DSL de-mapper 20 and supplied to Phase Difference Encoder (PDE) 21 via interface 15. PDE 21 is also connected to the external PRC source 1 via timing interface 2. Using both clocks, PDE 21 computes the phase difference, encodes this phase difference information, forwards the EPDI over interface 22 to packet assembly 23 that encapsulates or formats the EPDI into ToP format for transmission over network interface 7. PDE 21 is understood to be any digital and/or analog circuitry or processor-based system controlling digital and/or analog circuitry that is able to process two clock signals to compute and/or calculate the phase difference between said signals. Packet assembly 23 (also referred to as a packetizer) is any known digital circuit or system or microprocessor controlled system that is able to rearrange digital information in the form of packets or groups of packets in accordance with a known or designed protocol.

Figure 6B:
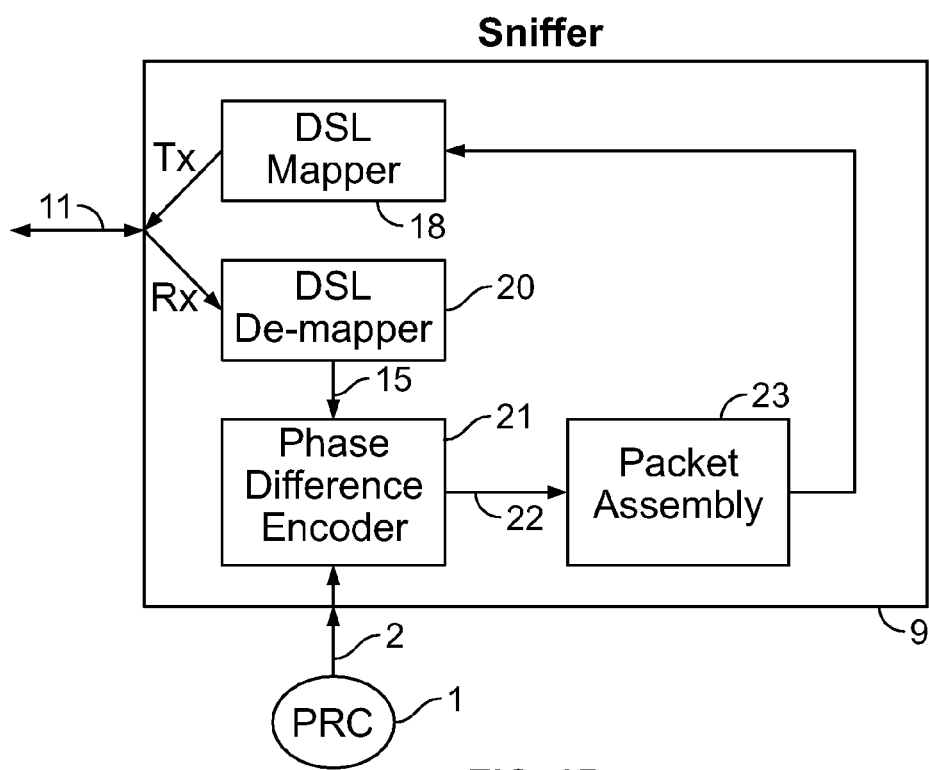
FIG. 6*b* depicts the internals of a sniffer suitable for the second embodiment of the present invention where furthermore the timing packets are forwarded via the DSL link.

FIG. 6b illustrates the generic structure of a sniffer 9 for the second embodiment presented in FIG. 5b, wherein the sniffer is remotely located from DSLAM 10. In this case, as illustrated in FIG. 6b, the dedicated differential timing packets, carrying the EPDI, are sent over DSL link 11 as payload from DSL mapper 18.

Figure 6C:
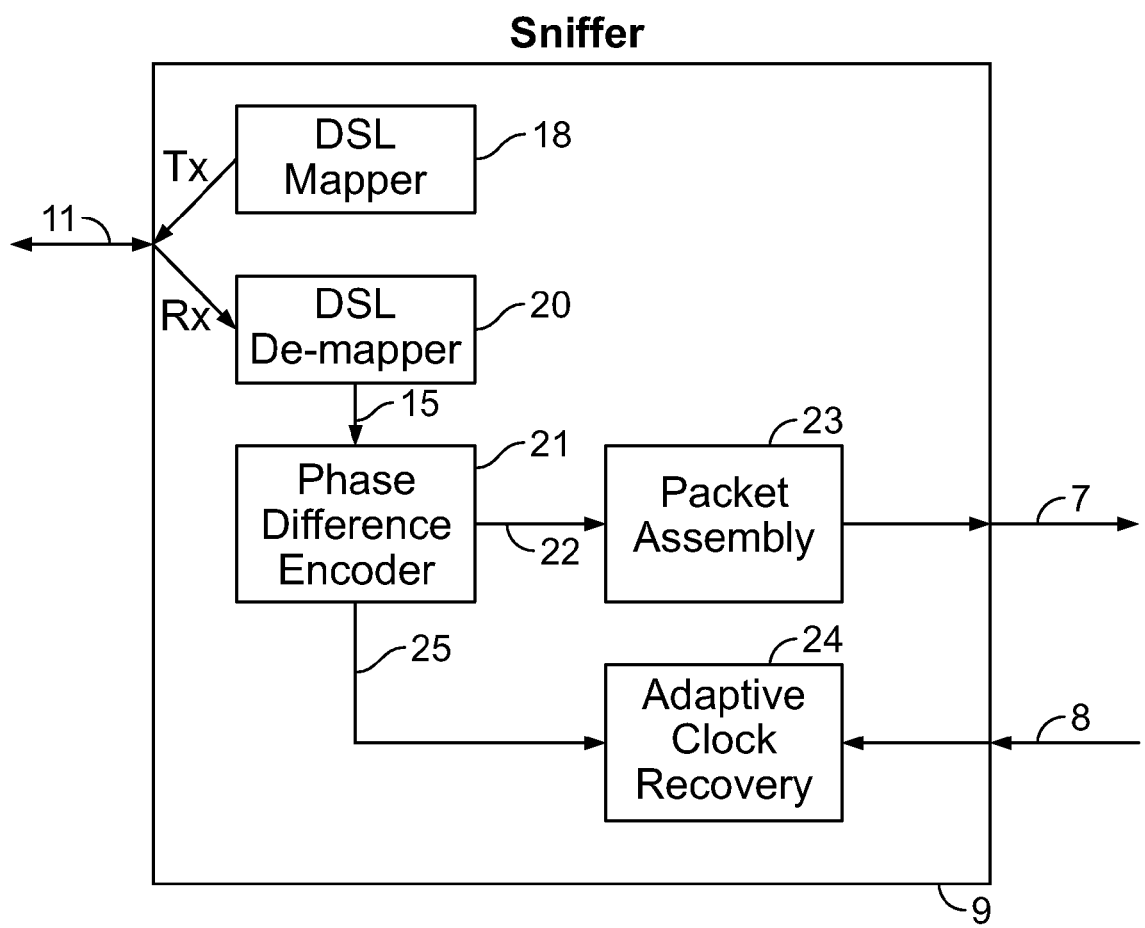
FIG. 6*c* depicts the internals of a sniffer suitable for the third embodiment of the present invention where furthermore the timing packets are forwarded to the DSLAM network-side port.

FIG. 6c illustrates a generic structure of a sniffer 9 for the third embodiment presented in FIG. 5c, where PRC source 1 is remotely located in the network. In this embodiment, dedicated timing packets are received by the Adaptive Clock Recovery (ACR) 24 (via network interface 8) that uses them to regenerate the frequency of the remotely located PRC source 1 using adaptive clock recovery techniques. The ACR regenerated clock is fed to PDE 21 using clock interface 25. Simultaneously, DSLAM's 10 LTR clock is extracted by DSL de-mapper 20 and supplied to PDE 21 via interface 15. Using both clocks, PDE 21 periodically sends EPDI over interface 22 towards packet assembly 23 that encapsulates them in dedicated differential ToP packets and transmits them via network interface 7.

In the embodiment of the sniffer of FIG. 6c, when multiple PRC sources need to be distributed, multiple PDEs 21 (all fed by the same LTR clock on interface 15) are used to generate multiple EPDI flows towards packet assembly 23, from which multiple ToP packet flows are sent to the remote CPEs 13.

Figure 7:
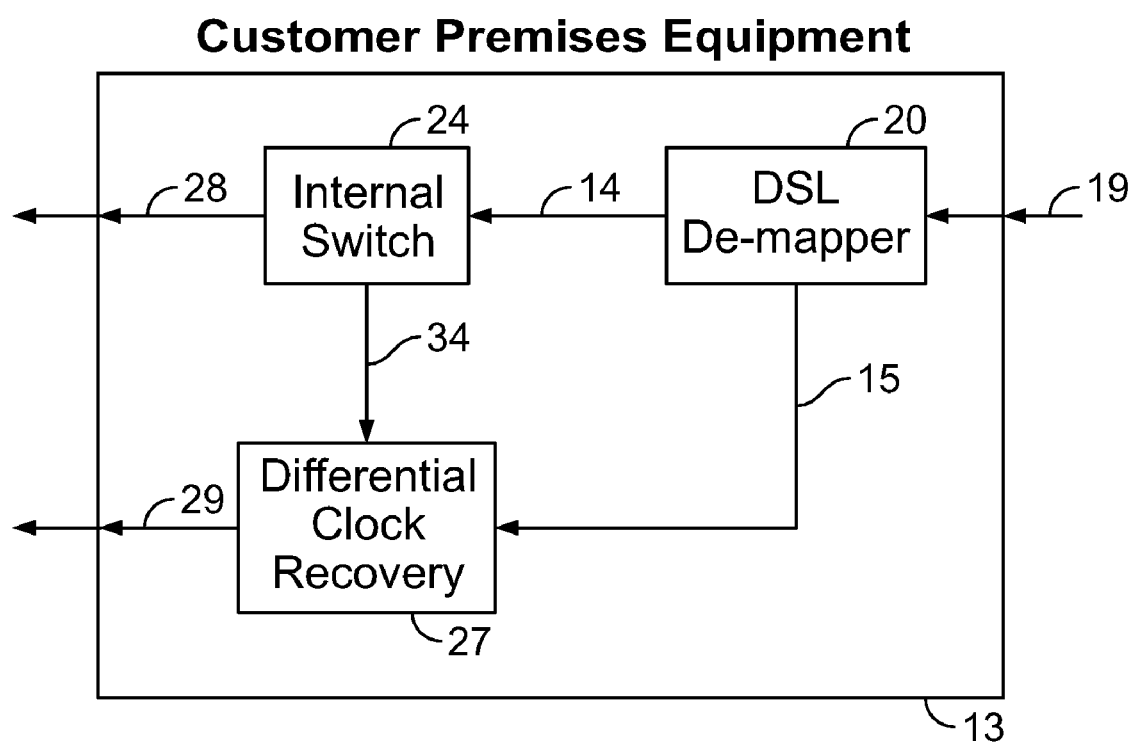
FIG. 7 depicts a Customer Premises Equipment (CPE) DSL modem with built-in differential clock recovery.

FIG. 7 illustrates a generic CPE DSL modem. DSL de-mapper 20 converts the DSL signal it receives from DSL link 19 into payload on interface 14 and recovered DSL physical-layer clock (DSLAM's LTR) on interface 15. Internal switch 24 delivers all user data packets toward the EUE on interface 28, while directing the ToP packets towards Differential Clock Recovery (DCR) 27 via network interface 34. Having access to both the DSLAM's LTR clock and the EPDI (extracted from the ToP packets), DCR 27 can now regenerate the original PRC source 1 on interface 29 towards the EUE.

The detailed explanation of the invention has been in the context of the DSLAM architecture shown in FIG. 4a, where all the DSL blades of the DSLAM are timed from a common internal LTR clock. The independent oscillator architecture case, shown in FIG. 4b, where each DSL blade is independently timed from a different LTR clock, can be considered an extension of the first architecture. In the case of the architecture of FIG. 4b, a separate sniffer could be connected to each DSLAM blade that has CPE which require synchronous operation, viz., require the PRC clock signal for their proper operation.

The independent oscillator architecture necessitates modifying the sniffer 9 to accommodate multiple DSL interfaces inputs (one for each DSLAM blade whose associated EUE device requires timing distribution) and a matching number of PDE (Phase Difference Encoder) units. All other components of the previously shown embodiments remain unchanged.

The invention claimed is:

1. A sniffer device comprising:
   a DSL line input port connected to receive a physical layer frequency signal from an output of a DSLAM;
   a timing reference input port;
   a phase difference encoder (PDE) deriving phase difference information from signals applied to the DSL line input port and the timing reference input port;
   a packetizer coupled to an output of the phase difference encoder for encapsulating the phase difference information into timing-over-packet (ToP) packets; and
   an output port capable of transferring timing-over-packet (ToP) packets.

2. The sniffer device of claim 1, wherein the phase difference encoder computes a phase difference between clock signals at the DSL line input port and the timing reference input port, and encodes said difference into encoded phase difference information (EPDI).

3. The sniffer device of claim 1, wherein the timing reference input port is directly connected to a Primary Reference Clock (PRC).

4. The sniffer device of claim 1, wherein the timing reference input port is connected to a clock traceable to a PRC.

5. The sniffer device of claim 1, wherein the timing reference input port receives ToP packets that were forwarded over a packet network from a clock distribution unit coupled to a PRC or PRC-traceable clock.

6. The sniffer device of claim 1, wherein the packet output port is directly connected to the network facing port of a DSLAM via a switch.

7. The sniffer device of claim 1, wherein the output port is connected to the DSLAM over a DSL link.

8. The sniffer device of claim 1, wherein the phase difference information is based on comparison of a local timing reference (LTR) applied to the DSL line input port and a primary reference clock (PRC) applied at the timing reference input port.

9. The sniffer device of claim 1, wherein the output port is connected to a DSLAM configured to receive the ToP packets from the sniffer device and send the ToP packets to customer premises equipment (CPE) units connected to the DSLAM.

10. A system for distributing timing information over DSL lines, the system comprising:
    a DSLAM not supporting standard NTR;
    a sniffer device having a timing reference input port, at least one DSL line input port connected to receive a physical layer frequency signal from an output of a DSLAM, and an output port,
    wherein the sniffer device computes the phase difference between the timing reference input and a physical-layer clock of a DSL line input, encodes said phase difference, encapsulates the encoded phase difference into ToP packets that are forwarded over one or more DSL lines; and at least one Customer Premises Equipment (CPE) device that recovers a clock signal traceable to a PRC by observing the physical-layer DSL clock and ToP packets sent from said sniffer.

11. The system of claim 10, wherein the DSLAM has a Local Timing Reference (LTR) that is either an internal free-running oscillator, or locked to a clock not traceable to a PRC.

12. The system of claim 10, wherein the output port of the sniffer device is coupled to the DSLAM via a DSL line.

13. The system of claim 10, wherein the output port of the sniffer device is coupled to the network facing port of the DSLAM via a switch.

14. The system of claim 10, wherein the timing reference input port of the sniffer device is directly connected to a PRC.

15. The system of claim 10, wherein the timing reference input port of the sniffer device is connected to a clock traceable to a PRC.

16. The system of claim 10, wherein the timing reference input port of the sniffer device receives ToP packets from a clock distribution unit coupled to a PRC or PRC-traceable clock.

17. The system of claim 10, wherein one or more CPE devices are connected to the DSL lines so as to recover a clock traceable to the PRC by processing ToP packets received from the sniffer.

18. The system of claim 10, wherein the phase difference is based on comparison of a local timing reference (LTR) applied to the DSL line input port and a primary reference clock (PRC) applied at the timing reference input port.

19. A method for distributing timing information over a DSL network using a sniffer device, comprising:
    computing a phase difference between a Primary Reference Clock and a DSL physical-layer clock;
    encoding said phase difference to encoded phase difference information (EPDI); and
    formatting the encoded phase difference information into ToP format, and
    forwarding ToP packets over the DSL network.

20. The method of claim 19, wherein the phase difference is based on comparison of a local timing reference (LTR) of a DSLAM and a primary reference clock (PRC).

* * * * *